Feb. 13, 1962 R. D. RANDALL ETAL 3,020,925
PILOT OPERATED REGULATOR MECHANISM
Filed Dec. 8, 1959
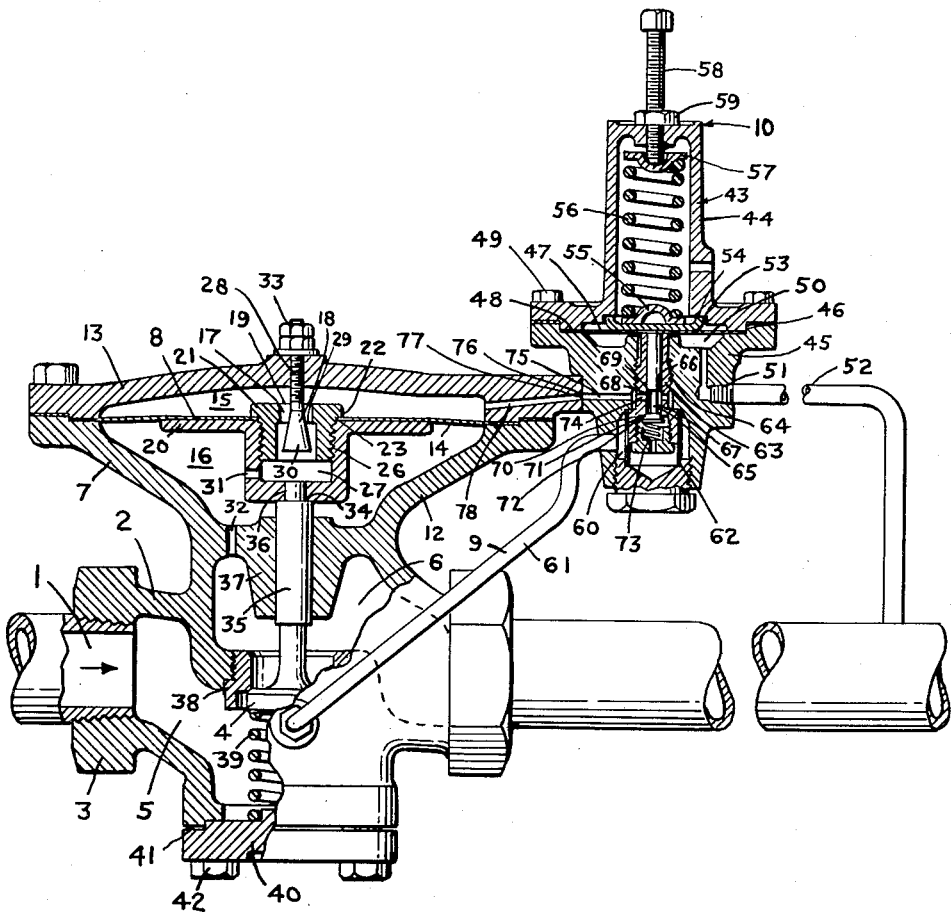
ROSS D. RANDALL
HANS D. BAUMANN
INVENTORS 3,020,925
PILOT OPERATED REGULATOR MECHANISM
Ross D. Randall, Needham, and Hans D. Baumann, Sharon, Mass., assignors to Worthington Corporation, Harrison, N.J., a corporation of Delaware
Filed Dec. 8, 1959, Ser. No. 858,262
2 Claims. (Cl. 137—489.5)

This invention relates to pressure regulators and more particularly to an improved pressure regulator having means to eliminate pressure fall-off in the flow system downstream of the regulator on increased discharge.

In pilot-operated diaphragm-type pressure regulators of the variety here considered the pressure downstream of the regulator is controlled by the setting of the axial stress of a spring in the pilot meter. The force which the spring exerts is the reactive calibrating reference with which the downstream pressure is compared for the control of the regulator.

Within the operational range of the regulator each length of spring has a corresponding downstream pressure. In the conventional pressure regulator an increase in discharge demand causes a decrease in the downstream pressure which acts as the pilot signal pressure upon the pilot meter diaphragm. This decrease in pressure occasions the elongation of the pilot spring. The stretched pilot spring exerts less force after it is elongated than it exerted before elongation. Accordingly, the increase in flow rate causes a reduction in the pilot spring thrust which serves as the downstream pressure reference and consequently causes a fall-off in downstream pressure.

The essence of the present improvement is to retain the pilot spring at a constant stress for a fixed downstream pressure setting by providing a variable flow bleed conduit bypassing the diaphragm of the pressure regulator.

Thus the present invention contemplates a variable bleed means for exhausting power fluid from the working chamber of the regulator. Gauging means are provided for controlling the rate of discharge through the bleed means, said gauging means are operable by the movement of the diaphragm. When increased flow causes movement of the diaphragm to constrict flow through the bleed means and thus produce a build-up of pressure in the working chamber, the increase of the pressure drop across the diaphragm further opens the valve thereby accommodating the increased discharge requirement. The bleed means accommodates the increased discharge requirement without the reduction in the pressure signal to the pilot meter which would result in the elongation of the pilot meter spring; thereby the variable bleed means overcomes the distortion of the calibration of the pilot spring and the consequent error in the reference for downstream pressure regulation.

An object of the invention is to provide a means for keeping downstream pressure constant in the steady-state-pressure operation of a variable-flow pilot-meter-spring-controlled diaphragm-type regulator as discharge through the regulator changes and especially to eliminate downstream pressure fall-off with increased discharge.

A further objective of this invention is to retain the stabilizing effect of the conventional fixed area bleed orifice.

Other objects and a fuller understanding of the invention may be had by referring to the following description and claims taken in conjunction with the accompanying drawing which is a fragmentary partly-sectional elevation view of a pilot-meter-controlled diaphragm-type regulator embodying the present invention.

The drawing shows a flow channel 1 and a pilot-meter-controlled diaphragm-type regulator generally described 2. The regulator 2 includes a valve housing 3 disposed in the flow channel 1, which has a partition therein and into which is disposed a control valve 4. The partition divides the flow channel 1 into an upstream side 5 and a downstream side 6. Main casing 7 has a valve actuating or diaphragm connecting means generally described 8 for positioning said valve 4. A power fluid conduit 9 communicating the main casing 7 and the upstream side 5 of said flow channel 1 supplies power fluid to operate the valve actuating means 8. A pilot meter 10 disposed in the power fluid conduit 9 regulates the supply of power fluid to the valve actuating means 8 to vary the position of the valve 4 in accordance with signals from the downstream side 6 of the flow channel 1.

The main casing 7 includes a lower segment 12 formed integrally with the valve housing 3 and a cover segment 13 which closes the main casing 7 so that a diaphragm 14 transversely mounted in the main casing 7 between the cover segment 13 and the lower segment 12 forms a working chamber 15 and a balancing chamber 16 communicates with the downstream side of the valve 6. The diaphragm 14 has a bleed orifice 17 formed therethrough. A stem 18 with a variable cross section along its length is connected to the cover segment 13 and engages the cover side 19 of the bleed orifice 17 formed in the diaphragm 14.

The diaphragm 14 is connected to the peripheral flange of the cylindrical member 20. The bleed orifice 17 is formed in the bleed orifice plug 21 which is inserted at the center 22 of the cylindrical member 20. The bleed orifice plug 21 penetrates a hole 23 in the diaphragm 14. The bleed orifice plug 21 is engaged by means of threads 26 into a center bore 27 of the cylindrical member 20.

The stationary member or stem 18 has an increasing cross section along its length formed on the stem plug 28 and is connected to the cover segment 13 of the main casing 7. Bleed orifice 17 in the bleed orifice plug 21 is connected in the cylindrical member 20 and coacts therewith to form a variable bleed opening 29. Since the bleed orifice plug 21 moves in unison with the diaphragm 14, the size of the bleed opening 29 is determined by the position of the diaphragm 14. The cross sectional area along the length of the stationary stem 18 is increased so that the cross sectional area is least near the stem plug 28 and is greatest near the end of the stem 30 remote from the stem plug 28. When the valve 4 is closed the bleed opening 29 is a maximum and when the valve 4 is at full discharge the bleed orifice 29 is a minimum. The bleed orifice 17 in the bleed orifice plug 21 communicates with the flow channel 1 on the downstream side 6 of the valve 4 by means of a lateral bore 31, the balancing chamber 16 and the balancing casing port 32.

The adjustment of the variable bleed opening 29 is readily accomplished by means of the lock nuts 33 which control the engagement of the stem plug 28 disposing the stem 18 in relation to the bleed orifice 17 in the bleed orifice plug 21.

The diaphragm 14 is arranged to bear upon the cylindrical member 20. The cylindrical member 20 is fashioned to bear upon a shoulder 34 formed on the valve stem 35 while the cylindrical member 20 slidingly engages a reduced section 36 of the valve stem 35. The valve stem 35 is formed on the valve 4 and slides along guides 37. Thus, there is an axial alignment of the thrust occasioned by the pressure drop across the diaphragm 14 to operate the valve 4. The valve 4 engages into a seat ring 38 and reacts against a valve spring 39. A blindhead 40, a blindhead casing gasket 41 and a plurality of blindhead cap screws 42 are provided below the valve spring 39 for convenient removal of the valve 4.

The housing 43 of the pilot meter 10 comprises the pilot spring case 44 and the pilot meter body 45 which are joined to bear upon the periphery 46 of the pilot diaphragm 47 and upon the pilot diaphragm gasket 48 by means of a plurality of spring case cap screws 49 thereby sealing the pilot diaphragm 47. The pilot diaphragm 47 defines a signal responsive chamber 50 in the pilot meter body 45. The signal responsive chamber 50 communicates with the flow channel 1 on the downstream side 6 of the valve 4 by means of the signal port 51 and the signal conduit 52. The pilot diaphragm 47 bears upon the pilot spider 53 which moves in a pilot spider track 54. A lower spring button 55 adapts the pilot spider 53 to bear upon the pilot spring 56 so that the pilot diaphragm 47 and the pilot spring 56 are in reactive relationship each to the other yielding a resultant force for pilot meter 10 operation. An upper spring button 57 adapts the pilot spring 56 to contact the adjusting screw 58 which engages the pilot spring case 44. Adjusting screw lock nuts 59 are provided to secure the adjusting screw 58 at any particular setting. A desired pressure in the flow channel 1 on the downstream side 6 of the valve 4 is obtained by establishing a fixed stress in the pilot spring 56 by engaging the adjusting screw 58 which bears upon the pilot spring 56 by means of the upper spring button 57. The adjusting screw 58 setting is maintained constant by means of the adjusting screw lock nuts 59.

The flow channel 1 on the upstream side 5 of the valve 4 is connected to the inflow chamber 60 of the pilot meter body 45 by means of the tubing 61. A cylindrical strainer 62 is provided in the inflow chamber 60. A pilot plug 63 engages the pilot meter body 45 by means of threads at 64. The pilot meter stem 65 moves in a center bore 66 of the pilot plug 63. The pilot diaphragm 47 bears directly upon the pilot meter stem 65. An annular passageway 67 is formed between the inside wall 68 of the pilot plug 63 and the pilot meter stem 65 by the reduced section 69 of the pilot meter stem 65. The pilot meter stem 65 has formed thereon the pilot meter closure element 70 which acts with a meter seat 71 to form the pilot meter opening 72. A meter seat spring 73 coacts with the pilot diaphragm 47 in reacting against the pilot spring 56 to control the position of the pilot meter closure element 70. The pilot meter opening 72 communicates with the pilot meter inflow chamber 60 passing fluid to the annular passageway 67 which communicates with a well 74 which in turn communicates with the pilot meter outflow conduit 75 formed in the pilot meter body 45 with a pilot meter outflow port 76. The pilot meter outflow port 76 matches and communicates with a power fluid inflow port 77 formed in the cover segment 13 of the main casing 7 and communicates with the working chamber 15 of the regulator 2 by means of the working fluid inflow conduit 78 in the cover segment 13.

*Operation*

The set thrust of the pilot spring 56 and the signal pressure acting in the signal responsive chamber 50 on the pilot diaphragm 47 react each against the other and the resultant force is aligned to control the pilot meter opening 72 thereby limiting the supply of power fluid to the working chamber 15 of the regulator 2. The pressure in the working chamber 15 of the regulator 2 in turn operates the valve 4 of the regulator 2 controlling flow to the downstream side 6 of the valve 4.

The problem is to eliminate pressure error on the change of discharge through the regulator 2. The pressure error is a result of distortion of the pilot spring 56 stress occasioned by the fall-off in the pressure in the signal responsive chamber 50.

The present invention eliminates pressure error on changes of discharge through the flow regulator 2. This is achieved by replacing the conventional fixed area bleed orifice of the regulator by a variable bleed opening 29.

The variable cross sectional area of the stem 18 is arranged so as to present an approximately maximum flow area when the valve 4 is closed and to progressively decrease this flow area as the valve 4 travels open until an approximately minimum area is exposed at full valve lift.

When a particular steady-state pressure has been established, the flow through the regulator 2 may vary according to changes in downstream demand or similar extraneous factors. By the change in bleed flow resulting from the movement of the bleed orifice 17 relative to the stem 18 thereby changing the pressure in the working chamber 15 to reset the valve 4 the change in discharge or similar extraneous factor is accommodated. For instance an increase of discharge causes a decrease in downstream pressure with a corresponding increase in the pressure drop across the diaphragm 14 of the regulator 2. The increased pressure drop causes a downward resetting of the diaphragm 14 and a like movement of the cylindrical member 20 and the bleed orifice plug 21. Accordingly, the cover side of the bleed orifice is moved to a thicker section of the stem 18 causing a smaller bleed opening 29 to be presented to the working chamber 15. With the reduction of the bleed flow the pressure in the working chamber 15 increases forcing the valve 4 open further to accommodate the increased flow requirement.

The spring rate of the pilot spring 56 can be compensated for in any desired degree by selecting the proper rate of reduction in bleed opening 29. The regulator 2 may then be given a flat pressure-discharge characteristic or even a rising one if it is desirable that the pressure slightly increase as the discharge load is increased.

Note that this device does not adversely affect the stability of the regulator proper, since instantaneously the regulator 2 operates like a fixed pressure-loaded unit. Momentary stability is furnished by the reduction in diaphragm 14 actuating pressure due to expansion when the valve 4 tends to open suddenly.

It will be understood that changes may be made in the details of construction and in the correlation of the various elements of the control means to accomplish the same results without departing from the spirit of the invention or the scope of the claims.

What is claimed is:

1. A mechanism to regulate the flow of pressurized fluid comprising, a casing having a flow channel for the pressurized fluid, a transverse partition in said casing to divide the flow channel into an upstream side and a downstream side, a valve port in said partition, a control valve in said casing in operative association with the valve port to control the flow of fluid from the upstream side to the downstream side of the flow channel, chamber means formed in said casing, diaphragm means to divide said casing chamber means into a working portion and a balancing portion, said diaphragm means having at least one opening to communicate said working portion with said balancing portion, passage means in said casing to communicate said balancing portion with the downstream side of the flow channel, conduit means to communicate said working portion with the upstream side of the flow channel whereby pressurized fluid from the upstream side of the flow channel enters said working portion, said diaphragm means operative responsive to the pressure differential between said working portion and said balancing portion, said control valve connected to said diaphragm and adapted to open on said diaphragm means moving towards the flow channel, a pilot valve disposed in said conduit means to regulate the flow of pressurized fluid from the upstream side of the flow channel to said working portion, spring means to actuate said pilot valve to a normally open position, chamber means formed in said pilot valve, tube means to communicate said chamber means of said pilot valve with the downstream side of the flow channel whereby pressurized fluid from the downstream side of the flow channel enter said chamber means, a diaphragm member in said pilot valve in operative association therewith, said diaphragm member in said pilot valve to separate said spring means and said chamber means, said diaphragm member of said pilot valve operative responsive to the pressure differential of the spring means and the pressure in said chamber means of said pilot valve, a stationary member connected to said casing and disposed in the opening of said diaphragm means in operative association therewith, said stationary member having an increasing cross-section in the direction away from said casing and adapted to progressively decrease the opening in said diaphragm means on said diaphragm means movement in the direction of the flow channel to throttle the passage of pressurized fluid therethrough whereby the lessened force of the extended pilot valve spring is compensated for and the pressure of the downstream side of the flow channel is maintained.

2. The combination claimed in claim 1 wherein said pilot valve includes means to pre-set the force of the spring means thereby obtaining a predetermined operative pressure on the downstream side of the flow channel.

References Cited in the file of this patent

UNITED STATES PATENTS

| | | |
|---|---|---|
| 1,139,533 | Kitchen | May 18, 1915 |
| 1,733,183 | Dean | Oct. 29, 1929 |
| 2,040,109 | Spence | May 12, 1936 |
| 2,917,268 | Soderberg et al. | Dec. 15, 1959 |
| 2,946,344 | Mott | July 26, 1960 |

FOREIGN PATENTS

| | | |
|---|---|---|
| 830,420 | France | May 16, 1938 |